United States Patent
Tobisu et al.

(10) Patent No.: US 9,621,220 B2
(45) Date of Patent: Apr. 11, 2017

(54) RADIO DEVICE AND DISTORTION CANCELLING METHOD

(71) Applicant: FUJITSU LIMITED, Kawasaki-shi, Kanagawa (JP)

(72) Inventors: Yusuke Tobisu, Yokohama (JP); Tadahiro Sato, Yokohama (JP); Hideyuki Kannari, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/239,359

(22) Filed: Aug. 17, 2016

(65) Prior Publication Data

US 2017/0077981 A1    Mar. 16, 2017

(30) Foreign Application Priority Data

Sep. 15, 2015  (JP) .................................. 2015-182293

(51) Int. Cl.
*H04B 1/04* (2006.01)
*H04B 1/44* (2006.01)
*H04B 1/00* (2006.01)

(52) U.S. Cl.
CPC ............. *H04B 1/44* (2013.01); *H04B 1/0007* (2013.01); *H04B 1/0475* (2013.01)

(58) Field of Classification Search
None
See application file for complete search history.

(56) References Cited

U.S. PATENT DOCUMENTS

| 7,415,250 | B2 | 8/2008 | Sasaki et al. |
| 7,876,867 | B2 | 1/2011 | Filipovic et al. |
| 8,098,779 | B2 | 1/2012 | Komninakis et al. |
| 8,290,100 | B2 | 10/2012 | Komninakis et al. |
| 8,483,314 | B2 | 7/2013 | Takayashiki |
| 8,855,175 | B2 * | 10/2014 | Wyville .................... H04B 1/38 375/219 |
| 8,874,153 | B2 * | 10/2014 | Bevan .................. H04B 1/1027 375/346 |
| 8,890,619 | B2 * | 11/2014 | Wyville ................. H04B 1/109 327/156 |

(Continued)

FOREIGN PATENT DOCUMENTS

| JP | 08-079143 | 3/1996 |
| JP | 2005-142881 | 6/2005 |

(Continued)

*Primary Examiner* — Tuan A Tran
(74) *Attorney, Agent, or Firm* — Fujitsu Patent Center

(57) ABSTRACT

A radio device includes: a processor that outputs a transmission signal containing a plurality of signals that are transmitted at different frequencies; an amplifier that amplifies the transmission signal output from the processor; and a transmitter/receiver that transmits by radio the transmission signal amplified by the amplifier and that receives by radio a signal having a frequency different from a frequency of the transmission signal. The processor generates a cancel signal based on the plurality of signals contained in the transmission signal, the cancel signal corresponding to an intermodulation distortion that occurs due to intermodulation among the plurality of signals, and the transmitter/receiver synthesizes the cancel signal generated by the processor with the transmission signal amplified by the amplifier.

9 Claims, 8 Drawing Sheets

(56) References Cited

U.S. PATENT DOCUMENTS

| | | | | |
|---|---|---|---|---|
| 8,983,454 B2* | 3/2015 | Bevan | ............... | H04B 1/1027 |
| | | | | 455/296 |
| 9,026,064 B2* | 5/2015 | Wang | ............... | H04B 1/109 |
| | | | | 330/49 |
| 9,413,417 B2* | 8/2016 | Fleischer | ............... | H04B 1/525 |
| 9,414,245 B2* | 8/2016 | Bevan | ............... | H04B 1/1027 |
| 9,420,479 B2* | 8/2016 | Bevan | ............... | H04B 1/1027 |
| 9,461,697 B2* | 10/2016 | Yu | ............... | H04B 1/525 |

FOREIGN PATENT DOCUMENTS

| | | |
|---|---|---|
| JP | 2007-060483 | 3/2007 |
| JP | 2010-500831 | 1/2010 |
| JP | 2010-220104 | 9/2010 |

\* cited by examiner

RADIO DEVICE AND DISTORTION CANCELLING METHOD

CROSS-REFERENCE TO RELATED APPLICATION

This application is based upon and claims the benefit of priority of the prior Japanese Patent Application No. 2015-182293, filed on Sep. 15, 2015, the entire contents of which are incorporated herein by reference.

FIELD

The embodiments discussed herein are related to a radio device and a distortion cancelling method.

BACKGROUND

A duplexer may be provided to a conventional radio communication device in which an antenna is shared between transmission and reception. In other words, when the frequency differs between a transmission signal and a reception signal, connection of the duplexer to the antenna enables electrical separation between a transmission path and a reception path in the radio communication device. Accordingly, the transmission signal does not interfere with the reception signal, which makes it possible to inhibit the reception quality from lowering.

A duplexer, however, mainly consists of a filter and it is difficult to completely prevent the transmission signal from leaking into the reception path. For this reason, intermodulation of the leaking transmission signal and the received interference signal may be caused in the reception path and the resultant intermodulation distortion may lower reception quality. In other words, when the frequency of a transmission signal and the frequency of an interference signal differ from each other, the intermodulation between these signals causes intermodulation distortion at a given frequency. When the frequency of the intermodulation distortion is contained in the frequency band of the reception signal, the intermodulation distortion hinders demodulation and decoding of the reception signal. Then, the accuracy of the reception data obtained from the reception signal lowers. For this reason, examinations have been performed on approximately reproducing the intermodulation distortion on the basis of the transmission signal and the interference signal and offsetting the intermodulation distortion according to the reproduced reproduction signal.

Patent Document 1: Japanese National Publication of International Patent Application No. 2010-500831

In recent years, the signal bandwidth used for radio communications have been increasing and multicarrier transmission in which signals are transmitted with multiple carriers at different frequencies have been practically used. In multicarrier transmission, because multiple transmission signals having different frequencies are transmitted, intermodulation between the transmission signals may cause intermodulation distortion.

Furthermore, the duplexer, the antenna, and a cable that connects the duplexer and the antenna to each other are a linear circuit and, normally, intermodulation distortion does not occur in these parts; however, intermodulation distortion due to the transmission signal may occur in the linear circuit because of an internal factor, such as erosion of the material or contamination of the connection surfaces between different types of metal or an external factor, such as a magnetic field or oscillation. The noted intermodulation distortion may be referred to as passive intermodulation (PIM). While the power of PIM is smaller than the power of a transmission signal, the power of the reception signal is generally smaller than the power of the transmission signal and therefore it is not allowed to ignore the influence of the PIM on the reception signal.

While, with respect to the reception signal to which intermodulation distortion, such as PIM, is added, the distortion may be canceled by using a reproduction signal obtained by approximately reproducing the intermodulation as described above, there is a problem in that it is difficult to improve the reception quality depending on the accuracy of the reproduction signal. In other words, it is difficult to completely reproduce the intermodulation distortion added to the reception signal and therefore, when the intermodulation distortion is canceled by adding the reproduction signal to the reception signal, part of the reproduction signal may be a noise. As a result, the noise added to the reception signal may increase, which may lower the reception quality.

Furthermore, when the intermodulation distortion in the reception signal is canceled, the intermodulation distortion that occurs due to the intermodulation between transmission signals is emitted while being added to the transmission signal. For this reason, there is a problem in that the intermodulation distortion may be a spurious emission.

SUMMARY

According to an aspect of an embodiment, a radio device includes: a processor that outputs a transmission signal containing a plurality of signals that are transmitted at different frequencies; an amplifier that amplifies the transmission signal output from the processor; and a transmitter/receiver that transmits by radio the transmission signal amplified by the amplifier and that receives by radio a signal having a frequency different from a frequency of the transmission signal. The processor generates a cancel signal based on the plurality of signals contained in the transmission signal, the cancel signal corresponding to an intermodulation distortion that occurs due to intermodulation among the plurality of signals, and the transmitter/receiver synthesizes the cancel signal generated by the processor with the transmission signal amplified by the amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The following embodiments are not to be construed as limiting the invention.

[a] First Embodiment

Figure 1:
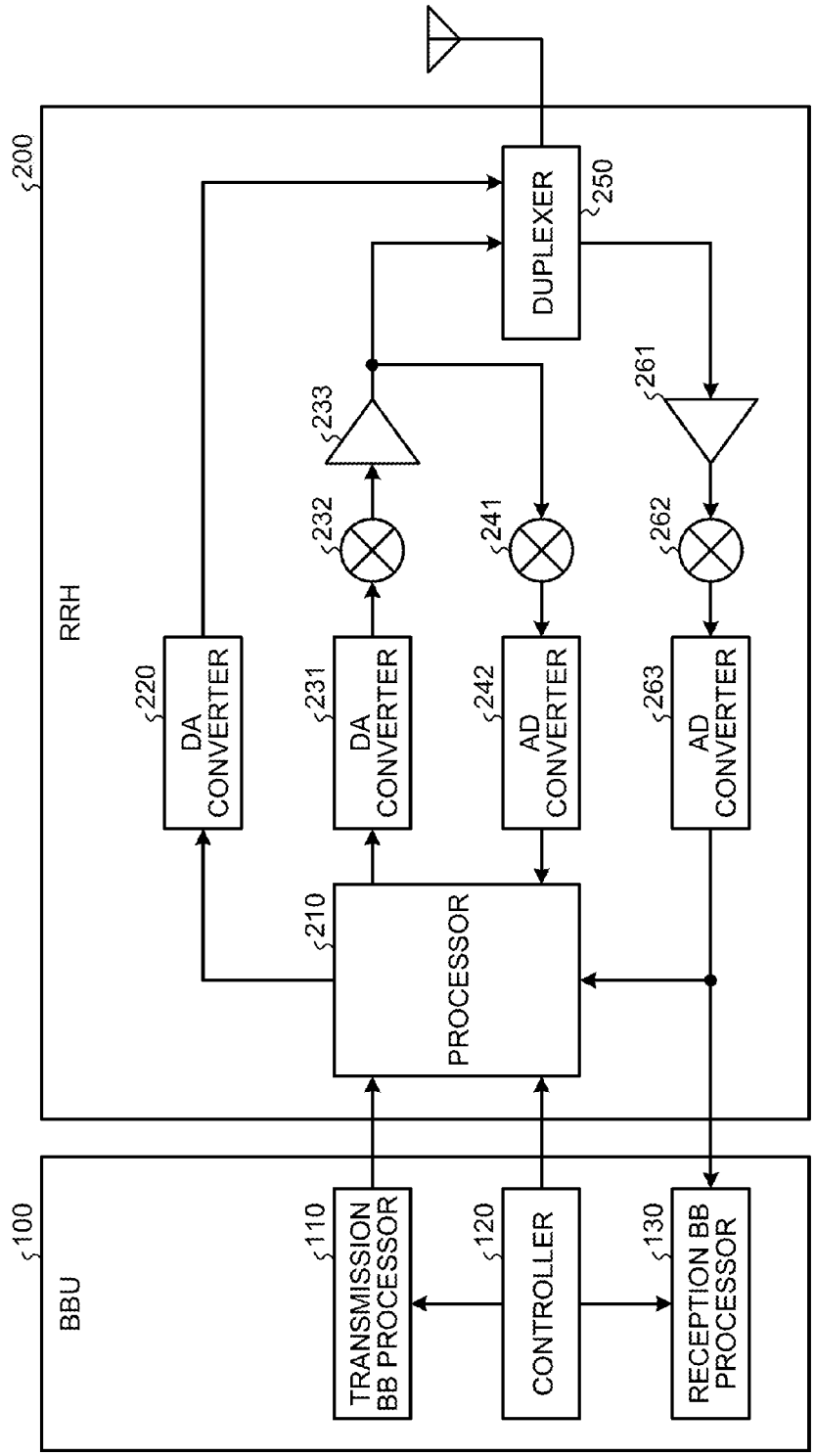
FIG. 1 is a block diagram of a configuration of a radio transmission system according to a first embodiment.

FIG. 1 is a block diagram of a configuration of a radio transmission system according to a first embodiment. The radio transmission system represented in FIG. 1 includes a baseband unit (BBU) 100 and a remote radio head (RRH) 200. Although it is not illustrated in FIG. 1, an RHH other than the RRH 200 may be connected to the BBU 100.

The BBU 100 performs baseband processing on a transmission signal and a reception signal. Specifically, the BBU 100 includes a transmission baseband processor (hereinafter, the "transmission BB processor") 110, a controller 120, and a reception baseband processor (hereinafter, the "reception BB processor") 130.

The transmission BB processor 110 performs transmission baseband processing, such as encoding, on the transmission data and transmits the resultant transmission baseband signal (hereinafter, "transmission BB signal") to the RRH 200. The transmission BB signal contains multiple signals that are transmitted at different frequencies.

The controller 120 controls the transmission BB processor 110 and the reception BB processor 130 to cause them to perform transmission baseband processing and reception baseband processing, respectively. The controller 120 notifies the RRH 200 of frequency information representing a transmission frequency band and a reception frequency band. According to the first embodiment, because the transmission signal and the reception signal are multicarrier signals containing carriers at multiple frequencies, the frequency information represents multiple different transmission frequency bands and reception frequency bands.

The reception BB processor 130 receives a reception baseband signal (hereinafter, the "reception BB signal") from the RRH 200 and performs reception baseband processing, such as decoding, on the reception BB signal to obtain reception data.

The RRH 200 is connected to the BBU 100 via an optical fiber and performs radio processing on the transmission signal and the reception signal. Specifically, the RRH 200 includes a processor 210, a digital analogue (DA) converters 220 and 231, mixers 232, 241 and 262, a power amplifier 233, an analogue digital (AD) converters 242 and 263, a duplexer 250, and a low-noise amplifier 261.

The processor 210 includes, for example, a central processing unit (CPU), a field programmable gate array (FPGA) or a digital signal processor (DSP) and performs various processes. Specifically, the processor 210 performs pre-distortion processing on the transmission BB signal received from the BBU 100 and compensates intermodulation distortion that occurs at the power amplifier 233. The processor 210 generates a cancel signal, based on the transmission BB signal, which is the cancel signal for cancelling the intermodulation distortion that occurs in the linear circuit from the duplexer 250 to the antenna. Specific functions of the processor 210 will be described in detail below.

The DA converter 220 performs DA conversion on the cancel signal that is generated by the processor 210 and outputs the converted signal to the duplexer 250.

The DA converter 231 performs DA conversion on the transmission BB signal on which pre-distortion processing has been performed by the processor 210 and outputs the resultant analogue signal to the mixer 232.

The mixer 232 up-converts the transmission signal that is output from the DA converter 231 and outputs the resultant transmission signal having a radio transmission frequency to the power amplifier 233.

The power amplifier 233 amplifies the transmission signal that is output from the mixer 232 and outputs the amplified transmission signal to the duplexer 250. In the power amplifier 233, an intermodulation distortion occurs in the transmission signal due to non-linearity of the power amplifier 233; however, because the processor 210 has performed the pre-distortion processing, the intermodulation distortion at the power amplifier 233 is suppressed.

The mixer 241 down-converts a feedback signal that is the feedback of the transmission signal having been amplified by the power amplifier 233 and outputs the resultant feedback signal having a baseband frequency to the AD converter 242.

The AD converter 242 performs AD conversion on the feedback signal that is output from the mixer 241 and outputs the resultant digital feedback signal to the processor 210.

While transmitting the transmission signal having been amplified by the power amplifier 233 through the antenna, the duplexer 250 outputs the reception signal received by the antenna to the low-noise amplifier 261. Specifically, the duplexer 250 reduces the frequency components of the transmission signal other than the transmission frequency with a filter that allows transmission in the transmission frequency band and then outputs the transmission signal through the antenna. The duplexer 250 reduces the frequency components of the reception signal other than the reception frequency with a filter that allows transmission in the reception frequency band and then outputs the reception signal to the low-noise amplifier 261.

Furthermore, the duplexer 250 synthesizes the cancel signal, which is output from the DA converter 220, with the transmission signal to cancel the PIM that occurs in the transmission signal. In other words, the circuit from the duplexer 250 to the antenna is a linear circuit; however, PIM that is an intermodulation distortion may be added to the transmission signal in the linear circuit due to various internal factors and external factors. The duplexer 250 then synthesizes the cancel signal with the transmission signal having passed through the filter to cancel the PIM added to the transmission signal.

The low-noise amplifier 261 amplifies the reception signal that is output from the duplexer 250 and then outputs the reception signal having been amplified to the mixer 262.

The mixer 262 down-converts the reception signal having been amplified by the low-noise amplifier 261 and outputs the resultant reception signal having the baseband frequency to the AD converter 263.

The AD converter 263 performs AD conversion on the reception signal that is output from the mixer 262 and outputs the resultant reception BB signal to the processor 210 and transmits the reception BB signal to the BBU 100.

Figure 2:
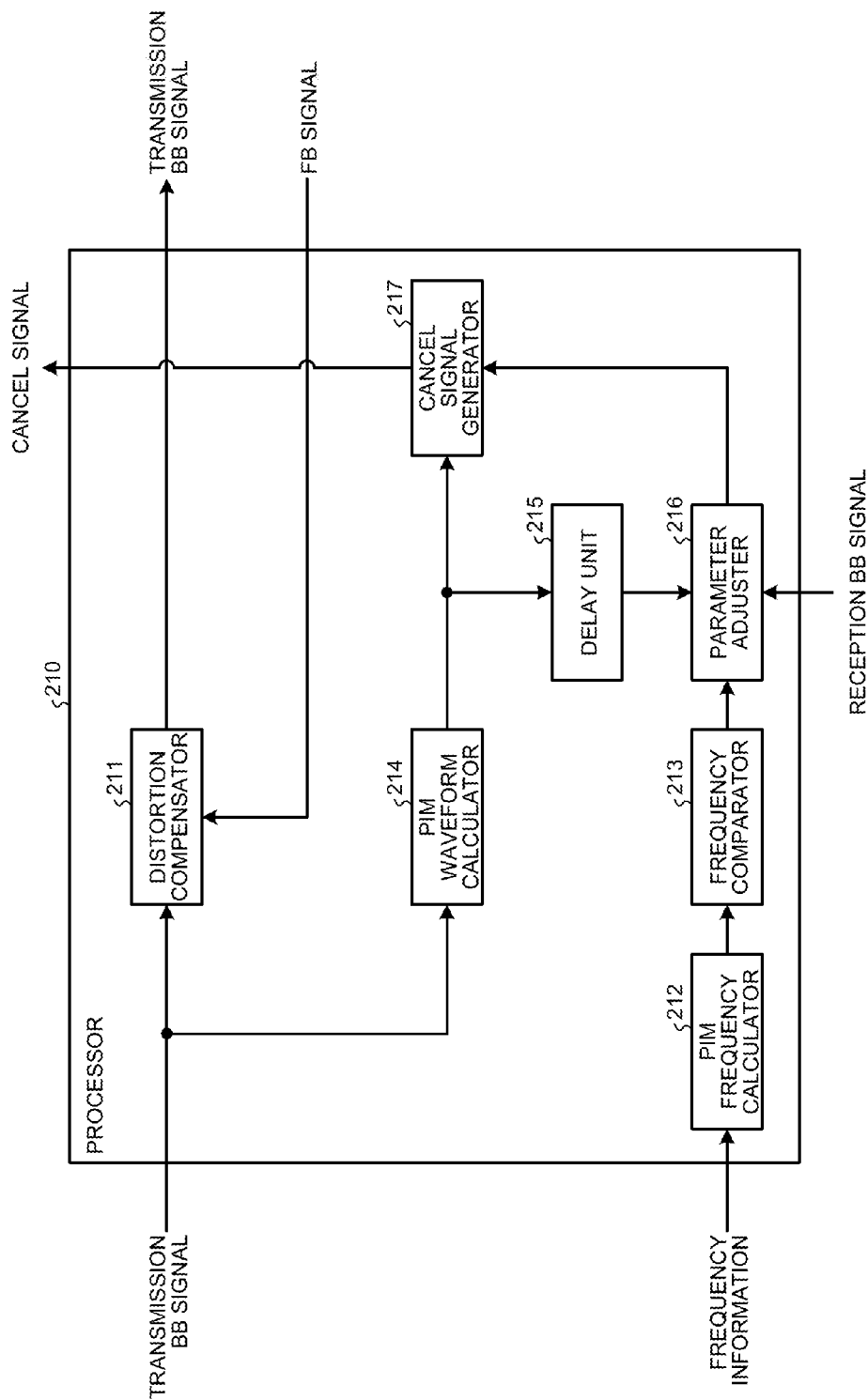
FIG. 2 is a block diagram of functions of a processor of a RRH according to the first embodiment.

The functions of the processor 210 will be described here with reference to FIG. 2. FIG. 2 is a block diagram of the functions of the processor 210 according to the first embodiment. The processor 210 represented in FIG. 2 includes a distortion compensator 211, a PIM frequency calculator 212, a frequency comparator 213, a PIM waveform calculator 214, a delay unit 215, a parameter adjuster 216, and a cancel signal generator 217. Each of these processing units may be configured of hardware or software.

The distortion compensator 211 performs the pre-distortion processing on the transmission BB signal. Specifically, the distortion compensator 211 adds a distortion compensation coefficient of the characteristics inverse to the intermodulation distortion that occurs in the transmission signal in the power amplifier 233. The distortion compensator 211 updates the distortion compensation coefficient according to the feedback signal ("FB signal" represented in FIG. 2) that is a feedback after amplification performed by the power amplifier 233. In other words, the distortion compensator 211 updates the distortion compensation coefficient such that, for example, the error between the transmission BB signal and the feedback signal decreases, thereby increasing the accuracy of the pre-distortion processing.

The PIM frequency calculator 212 calculates a PIM frequency at which PIM occurs according to the frequency information of which the PIM frequency calculator 212 is notified by the controller 120 of the BBU 100. Specifically, using the multiple frequencies at which the transmission signal is transmitted, the PIM frequency calculator 212 calculates, as the PIM frequency, frequencies at which a third-order intermodulation distortion and a fifth-order intermodulation distortion occurs. For example, because the third-order intermodulation distortion that occurs from a transmission signal 1 transmitted at a frequency $F_1$ and a transmission signal 2 transmitted at a frequency $F_2$ occur at a frequency $(2F_1-F_2)$ and at a frequency $(2F_2-F_1)$, the PIM frequency calculator 212 calculates these frequencies. Note that the PIM frequency calculator 212 calculates each frequency of intermodulation distortion to, for example, a given order, such as seventh-order. The PIM frequency calculator 212 may calculate not only intermodulation distortions of odd orders, such as third-order and fifth-order intermodulation distortions but also intermodulation distortions at even orders, such as second-order and fourth-order intermodulation distortions.

The frequency comparator 213 compares the PIM frequency that is calculated by the PIM frequency calculator 212 and the reception frequency band represented by the frequency information. When the PIM frequency and the reception frequency band overlap each other, the frequency comparator 213 issues an instruction for adjusting a parameter to the parameter adjuster 216. In other words, because it can be assumed that the reception quality lowers due to PIM when the PIM frequency and the reception frequency band overlap each other, the frequency comparator 213 starts the process of cancelling the PIM by issuing the instruction for adjusting the parameter.

Figure 3:
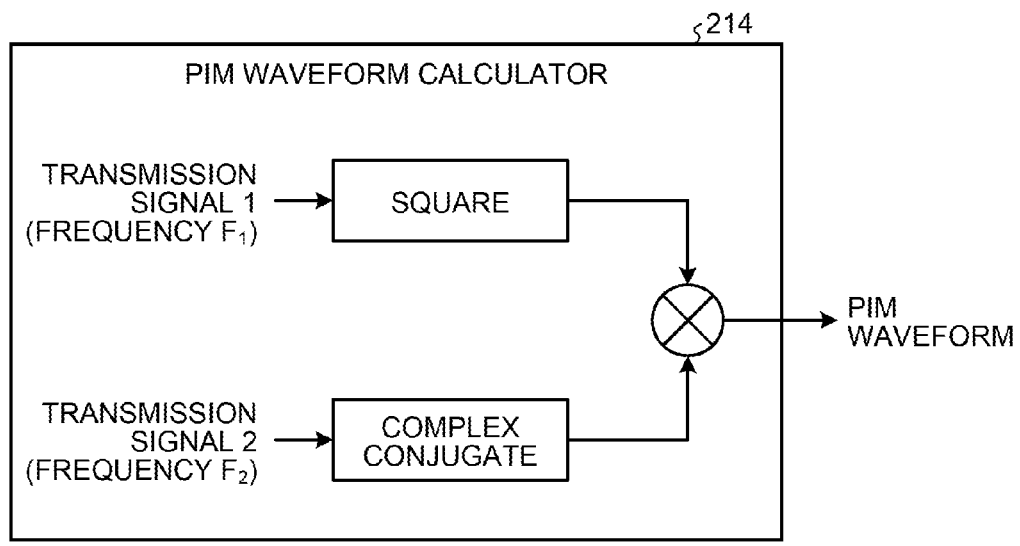
FIG. 3 is a diagram of a specific example of calculation of a PIM waveform.

The PIM waveform calculator 214 uses the transmission BB signal to calculate a PIM waveform. In other words, using multiple signals that are transmitted at different frequencies, the PIM waveform calculator 214 calculates, as the PIM waveform, waveforms of, for example, the third-order intermodulation distortion and the fifth-order intermodulation distortion that are occurs from these signals. For example, the waveform of the third-order intermodulation distortion that occurs from the transmission signal 1 that is transmitted at the frequency $F_1$ and the transmission signal 2 that is transmitted at the frequency $F_2$ is obtained by calculating the square of one of the transmission signals 1 and 2 and the complex conjugate of the other transmission signal and multiplying them. As represented in FIG. 3, the PIM waveform calculator 214 calculates the square of the transmission signal 1 and the complex conjugate of the transmission signal 2 and then multiplies them to calculate the PIM waveform. The PIM waveform calculator 214 may use another method to calculate the PIM waveform.

The delay unit 215 delays the PIM waveform that is calculated by the PIM waveform calculator 214. Specifically, the delay unit 215 delays the PIM waveform by the sum of the time taken by the transmission signal that is output from the processor 210 to reach the duplexer 250 and the time taken by the reception signal that is output from the duplexer 250 to reach the processor 210. In other words, the delay unit 215 delays the PIM waveform that is calculated by the PIM waveform calculator 214 by the required time from when the transmission signal is output from the processor 210 until the PIM occurring due to the transmission signal is added to the reception signal and then input to the processor 210.

Once the frequency comparator 213 issues the instruction for adjusting the parameter to the parameter adjuster 216, the parameter adjuster 216 adjusts the parameter for adjusting the cancel signal. Specifically, the parameter adjuster 216 adjusts the amount of delay, a phase, and a weighting coefficient assigned to the cancel signal. While notifying the cancel signal generator 217 of the parameter under adjustment, the parameter adjuster 216 performs a correlation operation between the PIM waveform delayed by the delay unit 215 and the reception BB signal output from the AD converter 263 and adjusts each parameter sequentially such that the correlated value is minimized. In other words, because the PIM components remaining in the reception BB signal is minimized when the cancel signal is adjusted according to the optimum parameter, the parameter adjuster 216 adjusts each parameter such that the correlation value between the reception BB signal and the PIM waveform is minimized. When the PIM components remaining in the reception BB signal is minimized, the power of the reception BB signal is minimized accordingly; therefore, the parameter adjuster 216 may adjust each parameter such that the power of the reception BB signal is minimized. The specific functions of the parameter adjuster 216 will be described in detail below.

The cancel signal generator 217 generates a cancel signal that offsets the PIM waveform that is calculated by the PIM waveform calculator 214 and adjusts the cancel signal according to the parameter of which the cancel signal generator 217 is notified. In other words, the cancel signal generator 217 generates a cancel signal having the waveform that is an inversion of the PIM waveform, adjusts the amount of delay and phase of the cancel signal, and multiplies the cancel signal by the weighting coefficient. The cancel signal generator 217 outputs the cancel signal to the DA converter 220.

Figure 4:
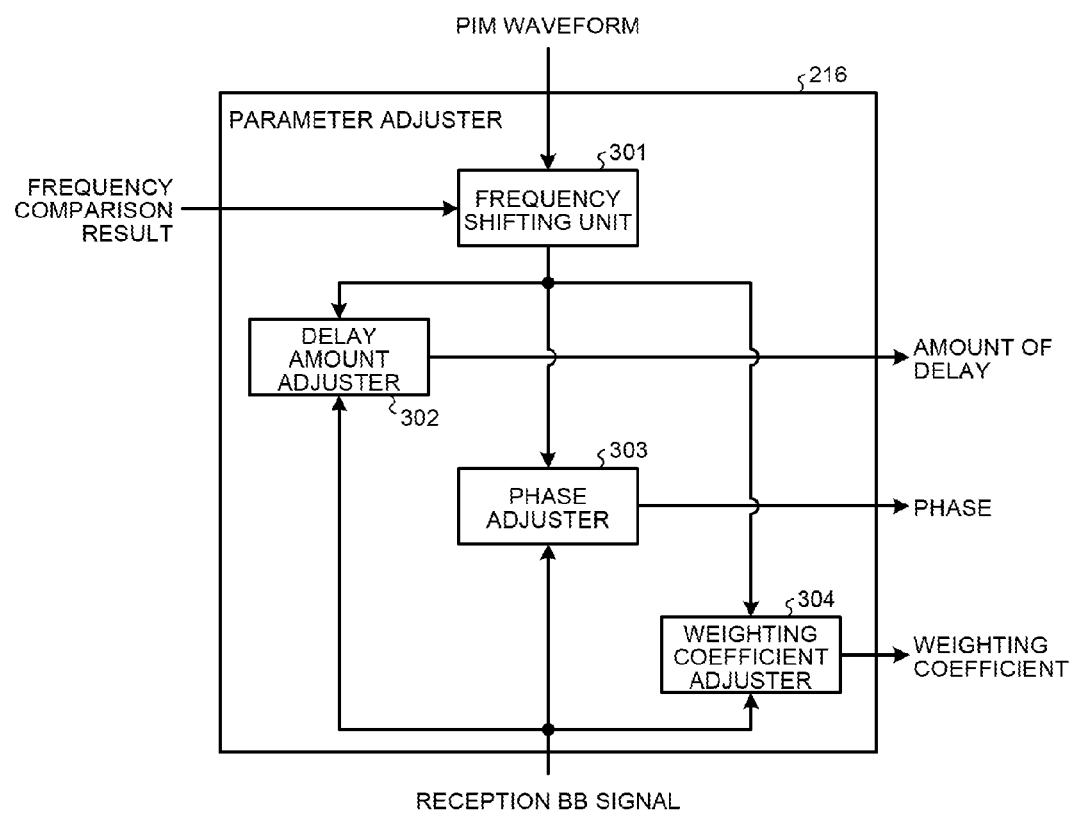
FIG. 4 is a block diagram of functions of a parameter adjuster.

The specific functions of the parameter adjuster 216 will be described here with reference to FIG. 4. FIG. 4 is a block diagram of the functions of the parameter adjuster 216. The parameter adjuster 216 includes a frequency shifting unit 301, a delay amount adjuster 302, a phase adjuster 303, and a weighting coefficient adjuster 304.

The frequency shifting unit 301 shifts the frequency of the PIM waveform according to the result of the frequency comparison performed by the frequency comparator 213. Specifically, the frequency shifting unit 301 shifts the frequency of the PIM waveform by the difference between the center frequency of the reception frequency band and the center frequency of the PIM. In other words, because the multiple signals that are transmitted at different frequencies have given bandwidths, respectively, the PIM frequency calculated by the PIM frequency calculator 212 has the given bandwidth. By shifting the frequency of the PIM waveform such that the center frequencies of the reception frequency band and the PIM frequency become uniform, the frequency shifting unit 301 facilitates the relative operation between the PIM waveform and the reception BB signal.

The delay amount adjuster 302 changes the amount of delay to be assigned to the cancel signal by each given amount and notifies the cancel signal generator 217 of the changed amount of delay. Each time the amount of delay to the cancel signal changes, the delay amount adjuster 302 performs a correlation operation between the PIM waveform and the reception BB signal and adjusts the amount of delay such that the correlation value is minimized.

The phase adjuster 303 changes the phase to be assigned to the cancel signal by each given amount and notifies the cancel signal generator 217 of the changed phase. Each time the phase to the cancel signal changes, the phase adjuster 303 performs a correlation operation between the PIM waveform and the reception BB signal and adjusts the phase such that the correlation value is minimized.

The weighting coefficient adjuster 304 changes the weighting coefficient by which the cancel signal is multiplied by each given amount and notifies the cancel signal generator 217 of the changed weighting coefficient. Each time the weighting coefficient by which the cancel signal is multiplied is changed, the weighting coefficient adjuster 304 performs a correlation operation between the PIM waveform and the reception BB signal and adjusts the weighting coefficient such that the correlation value is minimized.

The delay amount adjuster 302, the phase adjuster 303, and the weighting coefficient adjuster 304 may run independently and, when one parameter is optimized, adjustment of the next parameter may be started. In other words, when adjustment of the delay amount performed by the delay amount adjuster 302 completes, each parameter may be adjusted sequentially, for example, the phase adjuster 303 may then start adjusting the phase.

Figure 5:
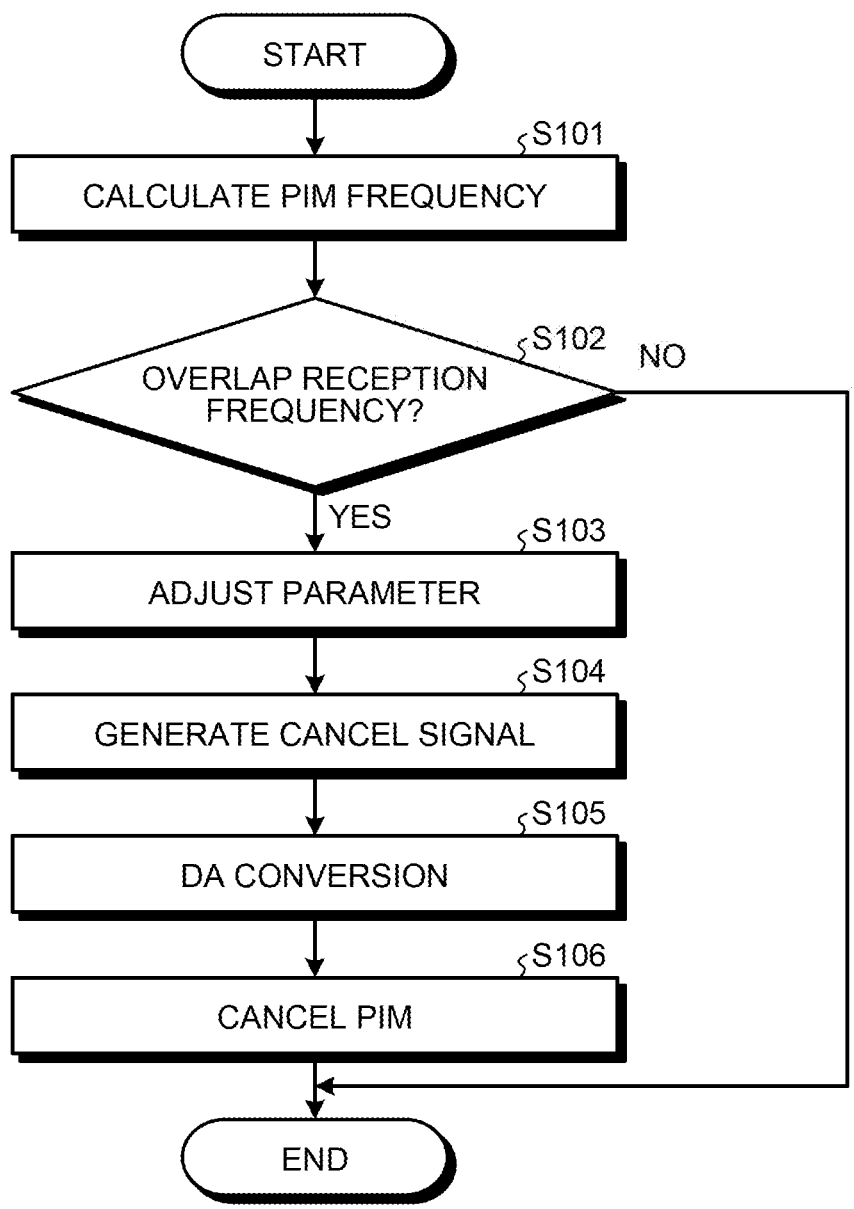
FIG. 5 is a flowchart of a distortion cancelling process according to the first embodiment.

A distortion cancelling process performed by the RRH 200 having the above-described configuration will be described here with reference to the flowchart illustrated in FIG. 5.

When the controller 120 of the BBU 100 issues a notification indicating frequency information representing a transmission frequency band and a reception frequency band, the PIM frequency calculator 212 of the processor 210 calculates a PIM frequency (step S101). In other words, using multiple frequencies at which a transmission signal is transmitted, frequencies at which, for example, a third-order intermodulation distortion and a fifth-order intermodulation distortion occur are generated are calculated as the PIM frequency. The PIM frequency has a bandwidth corresponding to the transmission frequency bandwidth of each transmission signal.

The frequency comparator 213 then determines whether the reception frequency band and the PIM frequency overlap each other (step S102). When the reception frequency and the PIM frequency do not overlap according to the result of the determination (NO at step S102), the reception quality does not lower due to the PIM and accordingly the process ends without generation of a cancel signal, etc.

On the other hand, when the reception frequency band and the PIM frequency overlap (YES at step S102), the parameter adjuster 216 adjusts the parameter for adjusting a cancel signal (step S103). The parameter is adjusted by using the PIM waveform that is calculated by the PIM waveform calculator 214 from the transmission BB signal. In other words, when the transmission BB signal is input to the processor 210, the PIM waveform calculator 214 calculates the PIM waveform generated from the transmission signal. The delay unit 215 delays the PIM waveform by the time period from when the PIM is added to a reception signal until the reception signal is input to the parameter adjuster 216. Accordingly, the reception BB signal that is input from the AD converter 263 and the PIM waveform that is input from the delay unit 215 are at corresponding timings, the parameter adjuster 216 is able to perform a correlation operation between the reception BB signal and the PIM waveform.

The parameter adjuster 216 performs the parameter adjustment as described below. Specifically, first of all, the frequency shifting unit 301 shifts the frequency of the PIM waveform by the difference between the center frequency of the reception frequency band and the center frequency of the PIM frequency according to the result of the frequency comparison performed by the frequency comparator 213. While changing the respective parameters, the delay amount adjuster 302, the phase adjuster 303, and the weighting coefficient adjuster 304 perform correlation operations between the PIM waveform whose frequency has been shifted and the reception BB signal. The delay amount adjuster 302, the phase adjuster 303, and the weighting coefficient adjuster 304 adjust the respective parameters such that the correlation values resulting from the correlation operations are minimized. This makes it possible to adjust the parameters such that the components of PIM remaining in the reception BB signal are minimized. In other words, it is possible to obtain the amount of delay, the phase, and the weighting coefficient for optimizing the cancel signal. The parameter adjustment may be performed, for example, during a given training period at the start of the PRH 200 or may be performed constantly while the RRH 200 is running.

Once the parameter adjustment completes, the cancel signal generator 217 generates a cancel signal, using the adjusted parameter (step S104). Specifically, the cancel signal generator 217 generates a cancel signal whose waveform is an inversion of the PIM waveform that is calculated by the PIM waveform calculator 214 and the cancel signal is adjusted according to each parameter. In other words, the delay amount and the phase of the cancel signal are adjusted and the cancel signal is multiplied by the weighting coefficient.

The cancel signal is output to the DA converter 220 where DA conversion is performed on the cancel signal (step S105). The cancel signal having undergone DA conversion is synthesized by the duplexer 250 with the transmission signal and cancels the PIM that occurs in the linear circuit from the duplexer 250 to the antenna (step S106). As a result, the PIM is removed from the transmission signal to be transmitted through the antenna and accordingly the spurious emission can be reduced. Furthermore, because the PIM that overlaps the reception frequency band is removed from the transmission signal, the reception signal added with the PIM is not output from the duplexer 250 and accordingly the reception quality can be inhibited from lowering.

As described above, according to the first embodiment, the PIM waveform is calculated from the multiple signals that are transmitted at different frequencies and, when the frequency of the PIM overlaps the reception frequency band, the cancel signal that offsets the PIM waveform is generated and is synthesized with the transmission signal having been amplified. Accordingly, the PIM occurring in the transmission signal can be removed by the cancel signal and the PIM added to the reception signal can be reduced at, for example, the duplexer. As a result, even when multiple transmission signals having different frequencies are transmitted, it is possible to inhibit the reception quality from lowering due to the intermodulation distortion among the transmission signals.

[b] Second Embodiment

The characteristics of a second embodiment are in that DA conversion is performed on a transmission BB signal and a cancel signal by a common DA converter to reduce the circuit scale.

Figure 6:
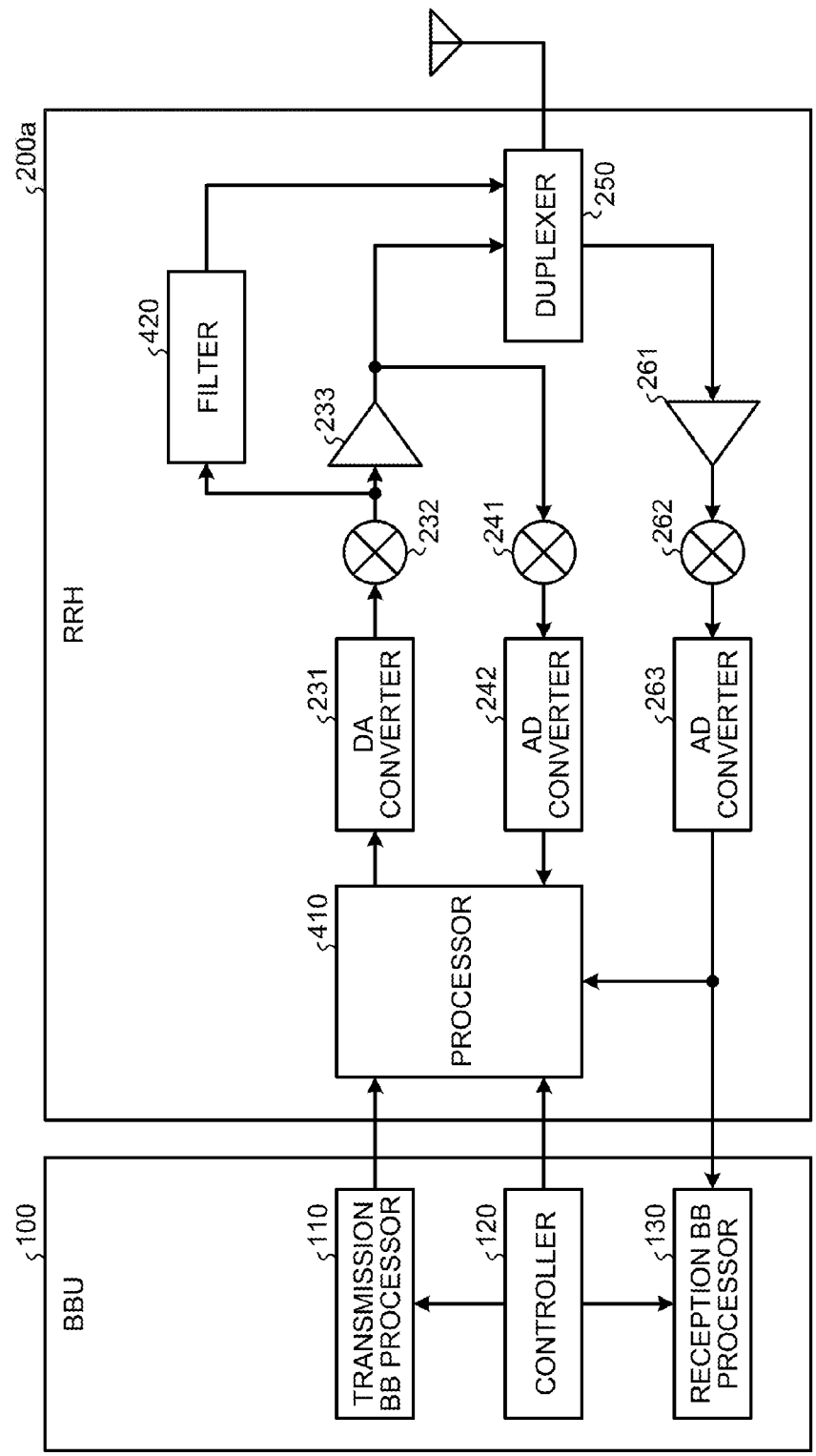
FIG. 6 is a block diagram of a configuration of a radio transmission system according to a second embodiment.

FIG. 6 is a block diagram of a configuration of a radio transmission system according to the second embodiment. The same components represented in FIG. 6 as those represented in FIG. 1 are denoted with the same reference numbers and descriptions of the same components will be omitted below. In the radio transmission system represented in FIG. 6 includes the BBU 100 and a RRH 200a. Although it is not illustrated in FIG. 6, another RRH other than the RRH 200a may be connected to the BBU 100.

The RRH 200a includes a processor 410 and a filter 420 instead of the processor 210 and the DA converter 220 of the RRH 200 represented in FIG. 1.

The processor 410 includes, for example, a CPU, FPGA or a DSP and performs various types of processing. Specifically, the processor 410 performs the pre-distortion processing on a transmission BB signal that is received from the BBU 100 and compensates an intermodulation distortion that occurs in the power amplifier 233. The processor 410 generates a cancel signal based on the transmission BB signal, which is the cancel signal for canceling the intermodulation distortion that occurs in the linear circuit from the duplexer 250 to the antenna and synthesizes the cancel signal with the transmission BB signal. The specific functions of the processor 410 will be described in detail below.

The filter 420 includes, for example, a low-pass filter or a band pass filter and removes the components of a transmission frequency band from an input signal. In other words, the filter 420 removes the components of the transmission frequency band from the transmission signal with which the cancel signal is synthesized and outputs the resultant cancel signal components to the duplexer 250.

Figure 7:
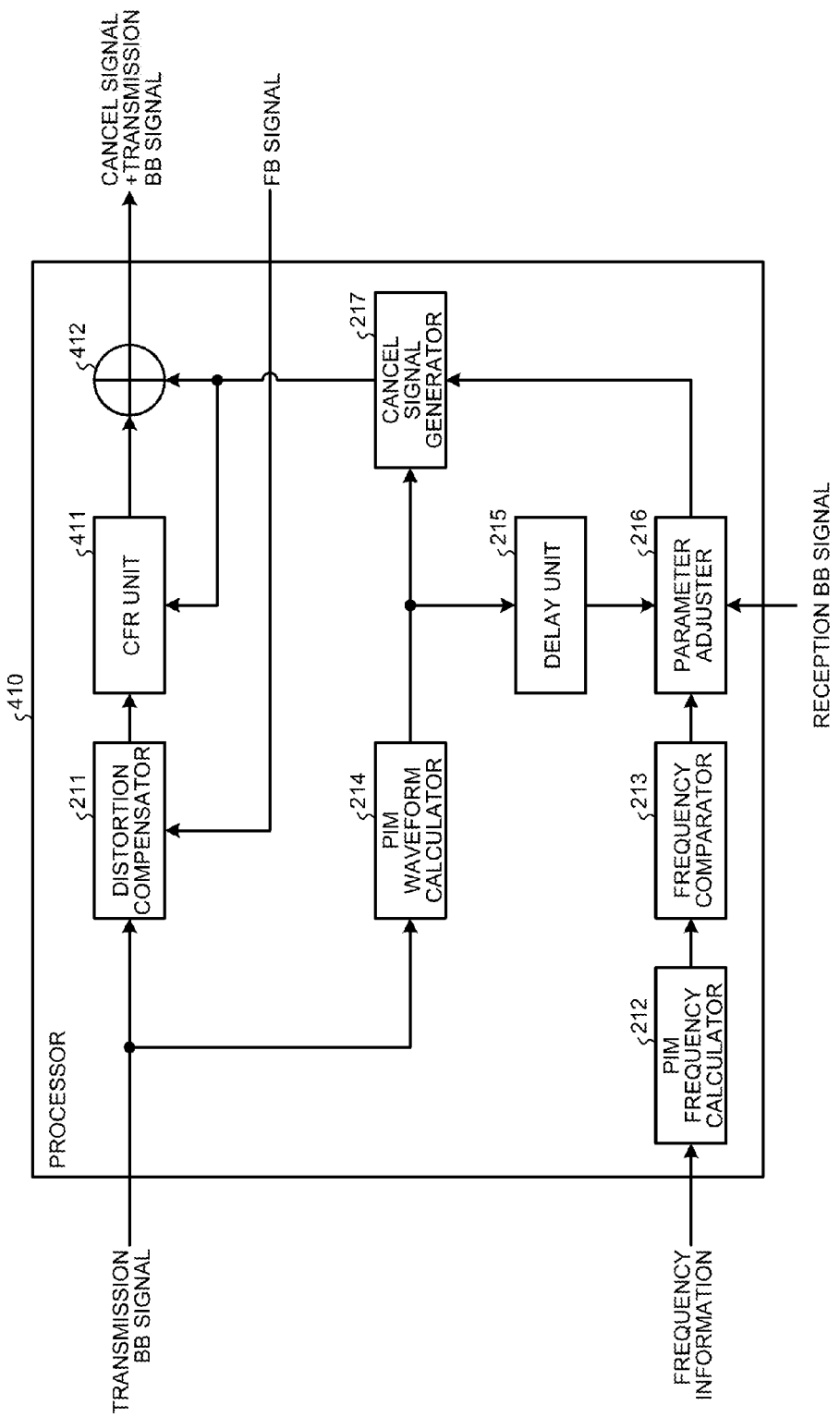
FIG. 7 is a block diagram of functions of a processor of a RRH according to the second embodiment.

The functions of the processor 410 will be described with reference to FIG. 7. FIG. 7 is a block diagram of the functions of the processor 410 according to the second embodiment. The same components represented in FIG. 7 as those represented in FIG. 2 are denoted with the same reference numbers and descriptions of the same components will be omitted below. The processor 410 represented in FIG. 7 employs a configuration in which a crest factor reduction (CFR) unit 411 and a synthesizer 412 are added to the processor 210 represented in FIG. 2.

The CFR unit 411 implements clipping on the transmission BB signal on which pre-distortion processing has been performed by the distortion compensator 211 to lower the peak power. Specifically, the CFR unit 411 changes a threshold of CFR that is predetermined according to the I/O characteristics of the power amplifier 233 to a value smaller than the threshold by the power of the cancel signal that is generated by the cancel signal generator 217. The CFR unit 411 then implements clipping on the transmission BB signal according to the changed CFR threshold. Accordingly, the peak power of the transmission BB signal has a margin equivalent to the power of the cancel signal.

The synthesizer 412 synthesizes the cancel signal that is generated by the cancel signal generator 217 with the transmission BB signal on which clipping has been implemented by the CFR unit 411. The synthesizer 412 outputs the transmission BB signal with which the cancel signal is synthesized to the DA converter 231.

Figure 8:
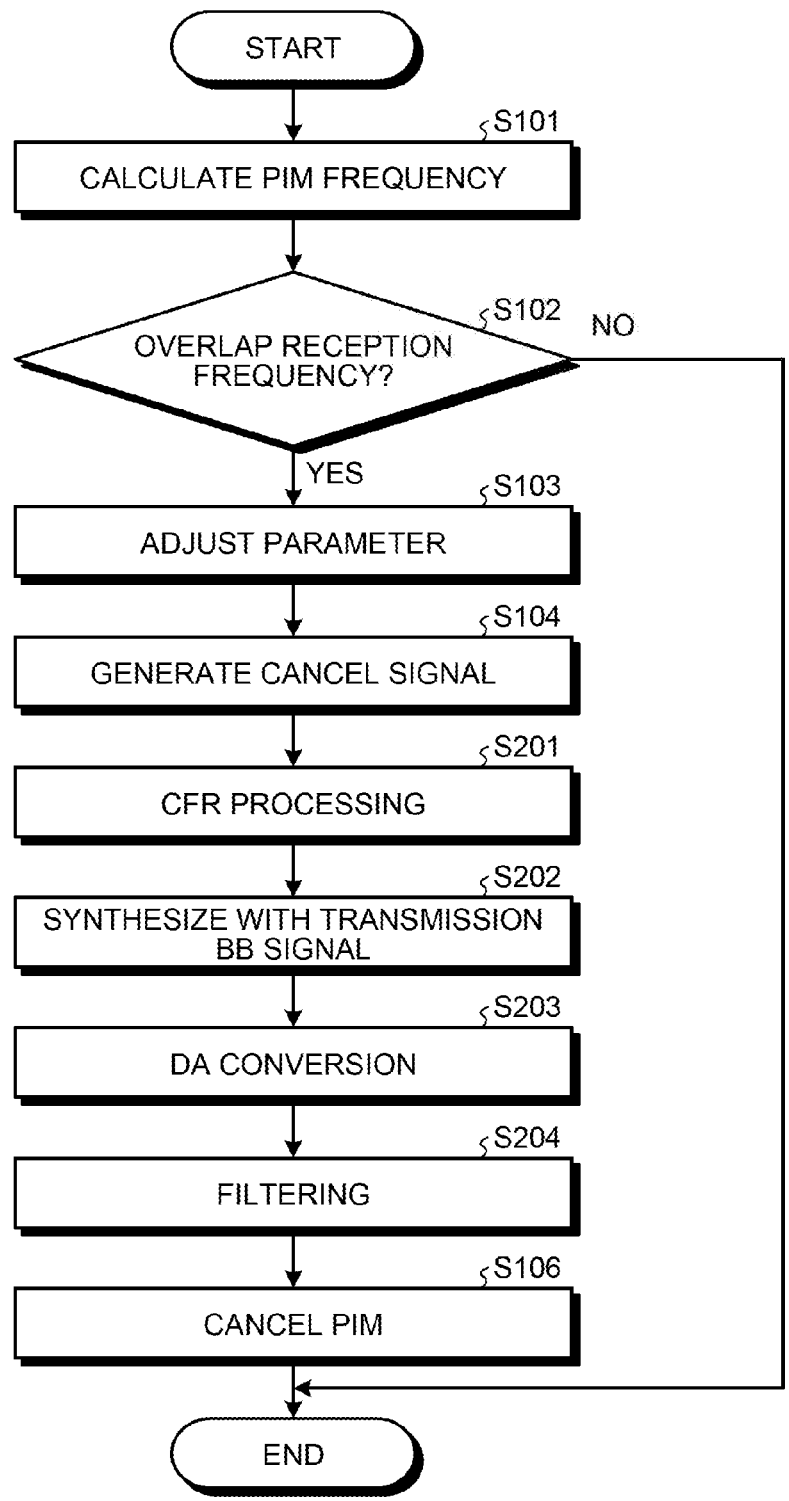
FIG. 8 is a flowchart of a distortion cancelling process according to the second embodiment.

The distortion cancelling process performed by the RRH 200a having the above-described configuration will be described with reference to the flowchart represented in FIG. 8. The same components represented in FIG. 8 as those represented in FIG. 5 are denoted with the same reference numbers and detailed descriptions of the same components will be omitted below.

When the controller 120 of the BBU 100 issues a notification indicating frequency information representing the transmission frequency band and the reception frequency band, the PIM frequency calculator 212 of the processor 410 calculates a PIM frequency (step S101). The frequency comparator 213 then determines whether the reception frequency and the PIM frequency overlap each other (step S102). When the reception frequency and the PIM frequency do not overlap each other according to the result of the determination (NO at step S102), the reception quality does not lower due to the PIM and accordingly the process ends without generation of a cancel signal, etc.

On the other hand, when the reception frequency and the PIM frequency overlap each other (YES at step S102), the parameter adjuster 216 adjusts the parameter for adjusting the cancel signal (step S103). In other words, the parameter adjuster 216 calculates the amount of delay, the phase, and the weighting coefficient for optimizing the cancel signal.

Once the parameter adjustment completes, the cancel signal generator 217 generates a cancel signal, using the adjusted parameter (step S104). Specifically, the cancel signal generator 217 generates a cancel signal whose waveform is an inversion of the PIM waveform that is calculated by the PIM waveform calculator 214 and the cancel signal is adjusted according to each parameter.

The generated cancel signal is output to the synthesizer 412 and the CFR unit 411 is notified of the power of the cancel signal. The CFR unit 411 then changes the threshold of CFR that is predetermined according to the I/O characteristics of the power amplifier 233 to a value smaller than the threshold by the power of the cancel signal. After the threshold of CFR is changed, the CFR unit 411 performs the CFR processing on the transmission BB signal (step S201). In other words, clipping is implemented on a part of the transmission BB signal whose power exceeds the changed CFR threshold and the power of the part is converted into a power equivalent to the CFR threshold. Even when the clipping reduces the peak power of the transmission BB signal and the cancel signal is synthesized with the transmission BB signal, the power of the signal after the synthesis matches the I/O characteristics of the power amplifier 233.

Then the synthesizer 412 synthesizes the cancel signal with the transmission BB signal (step S202) and the transmission BB signal with which the cancel signal has been synthesized is output to the DA converter 231. The DA converter 231 then performs DA conversion on the transmission BB signal with which the cancel signal has been synthesized (step S203) and the resultant analogue transmission signal is up-converted by the mixer 232. The up-converted transmission signal having a radio transmission frequency is amplified by the power amplifier 233 and is input to the duplexer 250. The cancel signal is synthesized with the transmission signal and the transmission signal passes through the filter that transmits the transmission frequency band in the duplexer, whereby the cancel signal is removed from the transmission signal.

The up-converted transmission signal having the radio transmission frequency is also input to the filter 420 and is filtered (step S204). In other words, the filter 420 removes the components of the transmission frequency band from the transmission signal with which the cancel signal has been synthesized and accordingly the cancel signal components are extracted. The cancel signal components are synthesized by the duplexer 250 with the transmission signal having passed through the filter and cancel the PIM that occurs in the linear circuit from the duplexer 250 to the antenna (step S106). As a result, the PIM is removed from the transmission signal to be transmitted through the antenna and the spurious emission can be reduced. Furthermore, because the PIM overlapping the reception frequency band is removed from the transmission signal, the reception signal added with the PIM is not output, which inhibits the reception quality from lowering.

As described above, according to the second embodiment, the PIM waveform is calculated from multiple signals that are transmitted at different frequencies and, when the frequency of the PIM overlaps the reception frequency band, the cancel signal that offsets the PIM waveform is generated and is synthesized with the amplified transmission signal and then DA conversion is performed on the transmission signal. The cancel signal is extracted from the transmission signal having undergone DA conversion and the cancel signal is synthesized with the amplified transmission signal. Accordingly, the PIM that occurs in the transmission signal is removed by the cancel signal and accordingly, the PIM added to the reception signal can be reduced at, for example, the duplexer. Accordingly, even when multiple transmissions signals having different frequencies are transmitted, it is possible to inhibit the reception quality from lowering due to the intermodulation distortion between the transmission signals. Furthermore, because the transmission signal and the cancel signal are synthesized and then DA conversion is performed, the DA converter can be shared, which reduces the circuit scale.

According to the first and second embodiment, when the PIM frequency and the reception frequency band overlap each other according to the result of comparison between the PIM frequency and the reception frequency band performed by the frequency comparator 213, the cancel signal is generated to cancel the PIM of the transmission signal; however, even when the PIM frequency and the reception frequency band do not overlap each other, a cancel signal may be generated to cancel the PIM of the transmission signal. As a result, the PIM is kept removed from the transmission signal to be transmitted through the antenna and the spurious emission can be reduced.

The radio transmission system including the BBU and the RRH has been exemplified to described the first and second embodiments; however, the first and second embodiments may be applied to a radio communication device, such as a base station device or a mobile terminal device.

Furthermore, the above-described distortion canceling process according to the first and second embodiments may be described as a computer-executable program. In this case, the program may be stored in a computer-readable recording medium and introduced into a computer. The computer-readable recording medium may be a portable recording medium, such as a CD-ROM, a DVD disk, or a USB memory, or a semiconductor memory, such as a flash memory.

According to an aspect of the embodiment of the radio device and the distortion cancelling method disclosed herein, an effect is achieved that, even when multiple transmission signals having different frequencies are transmitted, it is possible to inhibit the reception quality from lowering due to an intermodulation distortion between the transmission signals.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio device comprising:
a processor that outputs a transmission signal containing a plurality of signals that are transmitted at different frequencies;
an amplifier that amplifies the transmission signal output from the processor; and
a transmitter/receiver that transmits by radio the transmission signal amplified by the amplifier and that receives by radio a signal having a frequency different from a frequency of the transmission signal, wherein
the processor generates a cancel signal based on the plurality of signals contained in the transmission signal, the cancel signal corresponding to an intermodulation distortion that occurs due to intermodulation among the plurality of signals, and
the transmitter/receiver synthesizes the cancel signal generated by the processor with the transmission signal amplified by the amplifier.

2. The radio device according to claim 1, wherein
the processor calculates a frequency of the intermodulation distortion that occurs due to the intermodulation among the plurality of signals contained in the transmission signal according to frequency information containing information on a transmission frequency band and a reception frequency band in the transmitter/receiver, and
when the calculated frequency of the intermodulation distortion and the reception frequency band overlap each other, the processor generates the cancel signal.

3. The radio device according to claim 1, wherein
the processor calculates a waveform of the intermodulation distortion that occurs due to the intermodulation among the plurality of signals contained in the transmission signal, and
the processor generates a cancel signal having a waveform that is an inversion of the calculated waveform of the intermodulation distortion.

4. The radio device according to claim 3, wherein the processor adjusts an amount of delay, a phase, and a weighting coefficient of the generated cancel signal.

5. The radio device according to claim 4, wherein the processor adjusts the amount of delay, the phase, and the weighting value of the cancel signal such that correlation between the calculated waveform of the intermodulation distortion and a reception signal that is received by radio by the transmitter/receiver and is input to the processor is minimized.

6. The radio device according to claim 1, further comprising:
- a first digital analogue (DA) converter that performs DA conversion on the transmission output from the processor and outputs the transmission signal to the transmitter/receiver; and
- a second DA converter that performs DA conversion on the cancel signal generated by the processor and outputs the cancel signal to the transmitter/receiver.

7. The radio device according to claim 1, further comprising a filter that removes components of a transmission frequency band from an input signal, wherein
- the processor outputs the transmission signal with which the generated cancel signal are synthesized, and
- the filter extracts components of the cancel signal by removing the components of the transmission frequency band from the transmission signal output from the processor and outputs the components of the cancel signal to the transmitter/receiver.

8. The radio device according to claim 7, wherein
- the processor changes a clipping threshold that is predetermined according to input/output characteristics of the amplifier to a value smaller than the clipping threshold by a power of the generated cancel signal, implements clipping on the transmission signal, using the changed clipping threshold, and
- the processor synthesizes the cancel signal with the transmission signal on which the clipping has been implemented.

9. A distortion cancelling method performed by a radio device including a transmitter/receiver that transmits by radio a transmission signal containing a plurality of signals that are transmitted at different frequencies and that receives by radio a signal having a frequency different from a frequency of the transmission signal, the distortion cancelling method comprising:
- generating, by a processor, a cancel signal based on the plurality of signals contained in the transmission signal, the cancel signal corresponding to an intermodulation distortion that occurs due to intermodulation among the plurality of signals;
- amplifying the transmission signal; and
- synthesizing, by the transmitter/receiver, the cancel signal with the transmission signal having been amplified.

* * * * *